Dec. 26, 1950     E. O. WOELLER     2,535,339
DEVICE FOR SIZING THE ENDS OF TUBING

Filed March 7, 1949     2 Sheets-Sheet 1

INVENTOR.
Erich O. Woeller
BY
*Barnes Kisselle, Laughlin & Raisch*

ATTORNEYS.

Dec. 26, 1950  E. O. WOELLER  2,535,339
DEVICE FOR SIZING THE ENDS OF TUBING
Filed March 7, 1949  2 Sheets-Sheet 2
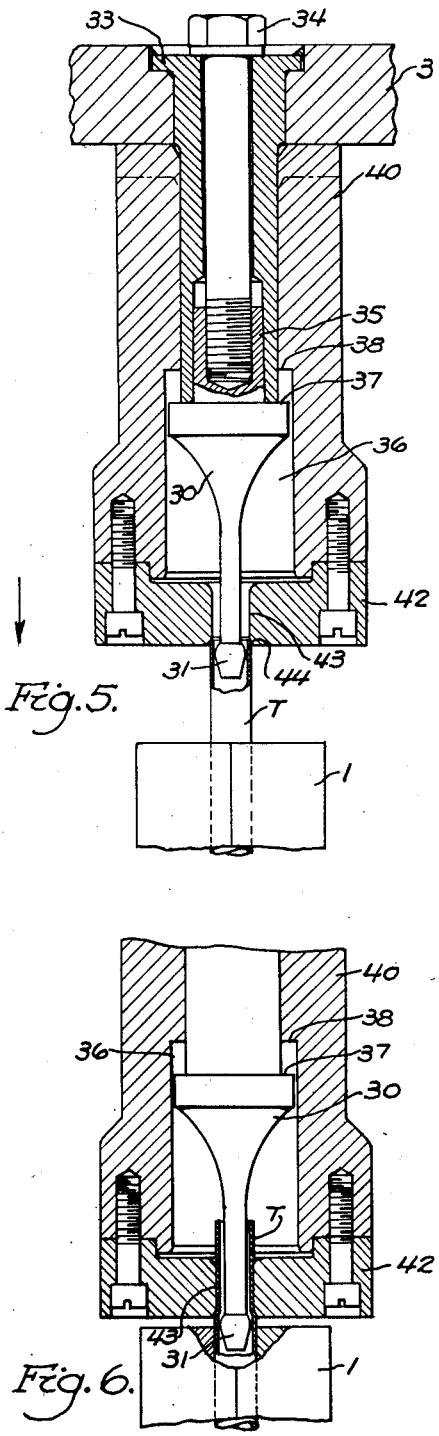
Fig. 5.
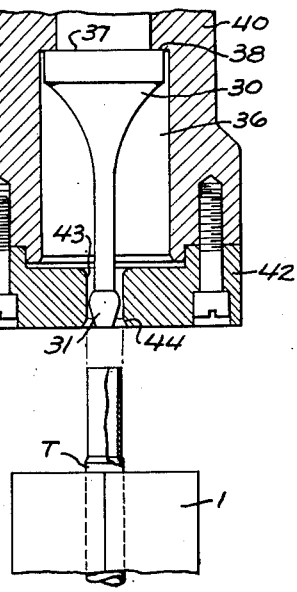
Fig. 6.
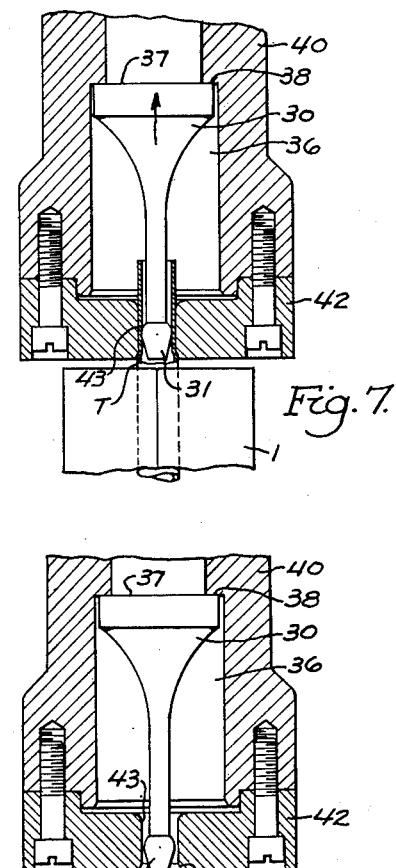
Fig. 7.
Fig. 8.
INVENTOR.
Erich O. Woeller
BY
Barnes, Kisselle, Laughlin & Raisch
ATTORNEYS.

Patented Dec. 26, 1950

2,535,339

UNITED STATES PATENT OFFICE 2,535,339

DEVICE FOR SIZING THE ENDS OF TUBING

Erich O. Woeller, Detroit, Mich., assignor to Bundy Tubing Company, Detroit, Mich., a corporation of Michigan Application March 7, 1949, Serial No. 79,933

2 Claims. (Cl. 153—80.5)

This invention relates to the manufacture of tubing and it has to do particularly with the sizing of the end portion of tube lengths.

Where tubing is used for some purposes, it is desirable or necessary to hold the inside and the outside diameter of the tubing at its end to very close tolerances. Some manufacturers which use tubing for various purposes require that these dimensions be held within very close limits. These dimensions may not be comparable to the original dimensions of the tubing involved. For instance, the required dimensions at the end of the tubing may be of slightly larger diameter than that of the tubing involved or may be slightly smaller than the tubing involved.

It is an object of the present invention to provide an apparatus for performing work on the end portion of tube lengths so as to give the end of the tube an accurate inside and accurate outside diameter. It is a further object of the invention to provide an apparatus wherein the end of a tube length may be expanded and yet held to very close tolerances as to both inside and outside diameter, and wherein the end portion of tube lengths may be ensmalled or swaged with the inside and outside diameters held to close tolerances. A still further object is to provide an apparatus wherein the tube may be so acted upon and treated in a single operation involving a simple reciprocable motion. The reciprocable motion involves a complete cycle of movement of the tube and the mechanism axially toward and away from each other. Needless to say, when the outside and inside diameters are maintained to close tolerances likewise the thickness of the tube wall is held to close tolerances, and the tube wall where it is so enlarged or ensmalled is made particularly smooth and even with a substantial absence of wrinkles or folds or marks thereon and this is accomplished by a sort of ironing action.

Structures made in accordance with the invention are shown in the accompanying drawings:

Fig. 5 is a view of a mechanism arranged and constructed to swage or ensmall the end of a length of tubing.

Fig. 6 is a view similar to Fig. 5 showing the parts in a position substantially at the completion of one stroke of the operation.

Fig. 7 is a view similar to Fig. 6 showing the position of the parts during the reverse stroke of the operation.

Fig. 8 is a view similar to Figs. 5, 6 and 7 showing the completion of the operation.

Figure 1:
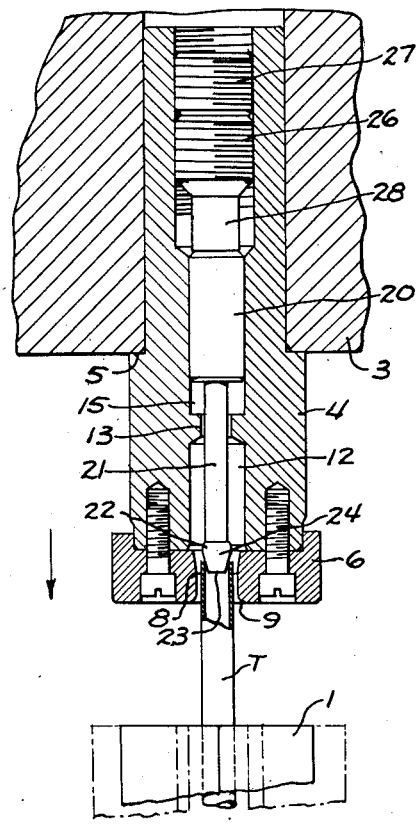
Fig. 1 is a view largely in section with some parts cut away showing an apparatus constructed in accordance with the invention and illustrating the position of the parts at the beginning of the operation.

The work piece, which is a tubing as shown at T, may be positioned in a suitable tube holding clamp 1. This clamp, of course, is one which may be opened so that successive lengths of tube may be placed therein and removed therefrom. The work piece is positioned so that an adequate length projects from the clamp as shown.

The portions of the mechanism for acting upon the tubing may be held in a suitable support which may be the movable ram 3 of a suitable press. Mounted in this ram is a holder 4 shouldered as at 5 to back up against the ram. The exposed end of the holder is provided with a sizing shell or die 6 having an aperture therein with appropriately contoured walls defining the aperture. These walls are preferably slightly tapered as shown at 8, so that the opening gradually decreases in diameter from the inside face of the die to the outside face of the die although the opening is preferably flared at its outer end as shown at 9.

Just to the rear of the die, the holder is provided with a cavity 12 and at the back of this cavity is an apertured seat 13, which may be circumferential in form, and it separates the cavity 12 from a chamber or cylinder 15. Slidably mounted in the chamber 15 is the body 20 of a mandrel. The mandrel has a stem 21 which projects through the apertured seat 13 and is provided with an operating head or part 22. This mandrel head is so shaped that it presents a tapering form with its outer end relatively small in cross section as shown at 23, and with an intermediate part at 24 of maximum diameter.

The mandrel is slidably disposed in the chamber 15 and is accordingly guided by the walls of the chamber. It is limited in one direction of movement by the seat 13 and in the opposite direction by an adjusting screw 26 which may be set and locked in position by a lock screw 27, the adjusting screw having a seat portion 28 for engagement with the body of the mandrel.

In the operation of the device, the tube is placed in the clamp 1 and then by relative movement between the tube and the mechanism, the tube is projected through the opening in the die. Now, this may be done by movement of the holding clamp or of the holder 4, but as shown herein the press ram which supports the holder 4 is the moving element. As the tube enters the die opening, the mandrel head enters the tube with the first position of entry substantially illustrated in Fig. 1.

Figure 2:
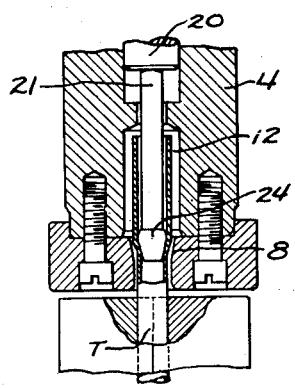
Fig. 2 is a view similar to Fig. 1 showing the position of the parts and the tubing substantially at the completion of one stroke in the operation.

With continued movement, the tubing is projected through the aperture and into the cavity 12. In this action the mandrel is projected into the tube and the end of the tube is enlarged as shown in Fig. 2. In this action, the mandrel backs up against and seats against the seat 28, so that the mandrel remains in fixed position relative to the die. In this action, the position of the mandrel is preferably such that the wall of the tube is expanded without contact with the die. In other words, there is no application of working forces to the exterior surface of the tube and the mandrel head and die opening are out of cooperating relationship.

Figure 3:
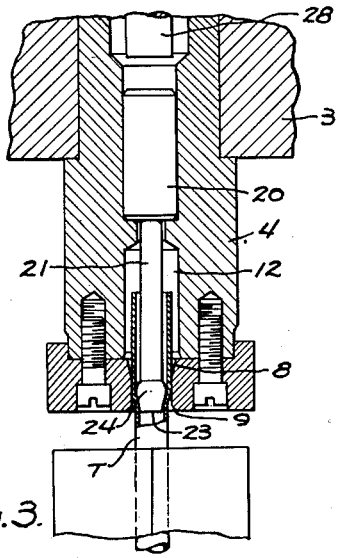
Fig. 3 is a view similar to Fig. 2 showing the position of the parts and the tubing in an intermediate portion of the second stroke of the operation.
Figure 4:
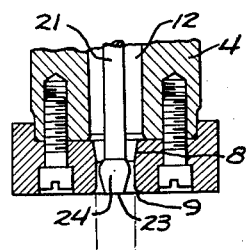
Fig. 4 is a view somewhat similar to Figs. 1, 2 and 3 showing the completion of the operation.

In the reverse movement, the holder moves away from the clamp, and as the die is withdrawn from the tube the mandrel remains stationary until the body 20 of the mandrel strikes the seat 13. At this time, the head of the mandrel is disposed within the opening of the die in the position shown in Fig. 3. The die and mandrel are now in cooperating relationship. The wall of the tube is thus tightly engaged and iron so to speak, between the mandrel and the walls of the die opening as it is withdrawn. When finally withdrawn, the parts are positioned as shown in Fig. 4, and it will be observed that the interior diameter of the tube is accurately determined by the mandrel and that the outside diameter is accurately determined by the die opening, resulting also in an accurate conditioning of the thickness of the tube wall. Moreover, the wall is given a smooth finish both inside and out.

In the form shown in Figs. 5 to 8, the end of the tube is swaged or ensmalled. The holding clamp, the tube, and the support or ram are indicated by the same reference characters. In this structure, the mandrel 30 has a head 31 similar to the head 22 of the previously described mandrel, and the mandrel is fixedly secured to the ram or support 3. This is accomplished in the structure shown in the drawings by a bushing 33 fixedly secured in the ram 3 and a cap screw 34 extends through the bushing, the threaded end of which engages an extension 35 on the mandrel, which extension telescopes into the bushing. The holder 40 is slidably mounted on the bushing. The holder has a cavity 36 for receiving the enlarged part of the mandrel, which has a seat 37 while the holder is shaped to provide a shoulder 38. The holder may slide or reciprocate on the bushing within the limits determined by the shoulder 37 and the support 3. The holder is provided with a swaging die 42 at its outer end which is formed with an opening 43, and the opening 43 has an outer flared or tapered end 44.

In the operation of this mechanism, the head 31 of the mandrel projects through the opening 43 of the die when the holder abuts the support 3 as indicated in Fig. 5. As the tubing and the mechanism approach each other, the tubing slides freely over the mandrel and engages the tapering walls 44 of the opening 43. As the relative movement continues the tubing is forcibly projected through the die opening and is thereby shrunk and ensmalled as shown in Fig. 6. Upon the reverse stroke, the mandrel retracts while the holder remains in the Fig. 6 position until the seat 37 strikes shoulder 38 as shown in Fig. 7. In this action, the opening in the die moves over the functioning head of the mandrel so that the wall of the tubing is tightly engaged between the walls 43 of the opening in the die and the head of the mandrel. As the movement continues, the walls of the tube are ironed and smoothed out by the die and mandrel, and when the tube is finally pulled free, as shown in Fig. 8, its outside and inside diameter is accurately formed to very close tolerances. Another tube is now inserted in the holding clamp and the process repeated. It might be stated that when the tubing and the mechanism approach each other, the end of the tubing engages the die as shown in Fig. 5, and moves the holder off the seat 37 and back against the support 3. This movement of the shell is accomplished without material resistance.

I claim:

1. A device for expanding the end of a length of tubing comprising, a relatively fixed die member with a die opening therein, the die opening having a diameter greater than the outside diameter of the tubing and adapted to have the end of a length of tubing projected thereinto from one side thereof, a mandrel member having a work part, the mandrel member being slidably mounted with respect to the die member so that in one extreme position the working part is on the opposite side of and out of cooperating relationship with the die opening, and in the other extreme position the working part lies in the die opening, the mandrel member being engageable by the tubing as it is projected, the operating part having a diameter greater than the inside diameter of the tubing, whereby the tubing, as it is projected through the die opening and then over the operating part of the mandrel is thereby expanded, the mandrel, upon withdrawal of the tubing, being shifted by the tubing to a position where its operating part lies in the die opening, whereby the expanded wall of the tubing, upon withdrawal of the tubing is engaged between the operating part of the mandrel and the walls of the opening and thereby accurately sized as to interior and exterior diameter.

2. A device for expanding the end of a length of tubing comprising, a relatively fixed die member with a die opening therein, the die opening having a diameter greater than the outside diameter of the tubing and adapted to have the end of a length of tubing projected thereinto from one side thereof, a mandrel member having a working part, the mandrel member being freely slidably mounted with respect to the die member so that in one extreme position the working part is on the opposite side of and out of cooperating relationship with the die opening, and in the other extreme position the working part lies in the die opening, the mandrel member being engageable by the tubing as it is projected, the operating part having a diameter greater than the inside diameter of the tubing, whereby the tubing, as it is projected through the die opening and then over the operating part of the mandrel is thereby expanded, the mandrel, upon withdrawal of the tubing, being shifted by the tubing to a position where its operating part lies in the die opening, whereby the expanded wall of the tubing, upon withdrawal of the tubing is engaged between the operating part of the mandrel and the walls of the opening and thereby accurately sized as to interior and exterior diameter.

ERICH O. WOELLER.

REFERENCES CITED

The following references are of record in the file of this patent:

UNITED STATES PATENTS

| Number | Name | Date |
|---|---|---|
| 693,119 | Diescher | Feb. 11, 1902 |
| 2,174,967 | Cartwright | Oct. 3, 1939 |

FOREIGN PATENTS

| Number | Country | Date |
|---|---|---|
| 139,786 | Australia | Dec. 10, 1934 |
| 15,351 | Great Britain | July 26, 1905 |
| 322,558 | France | Oct. 8, 1902 |
| 509,147 | Germany | Oct. 4, 1930 |